April 17, 1945.   F. J. SODAY   2,373,714
POLYMERIZATION OF INDENE
Filed Aug. 16, 1939
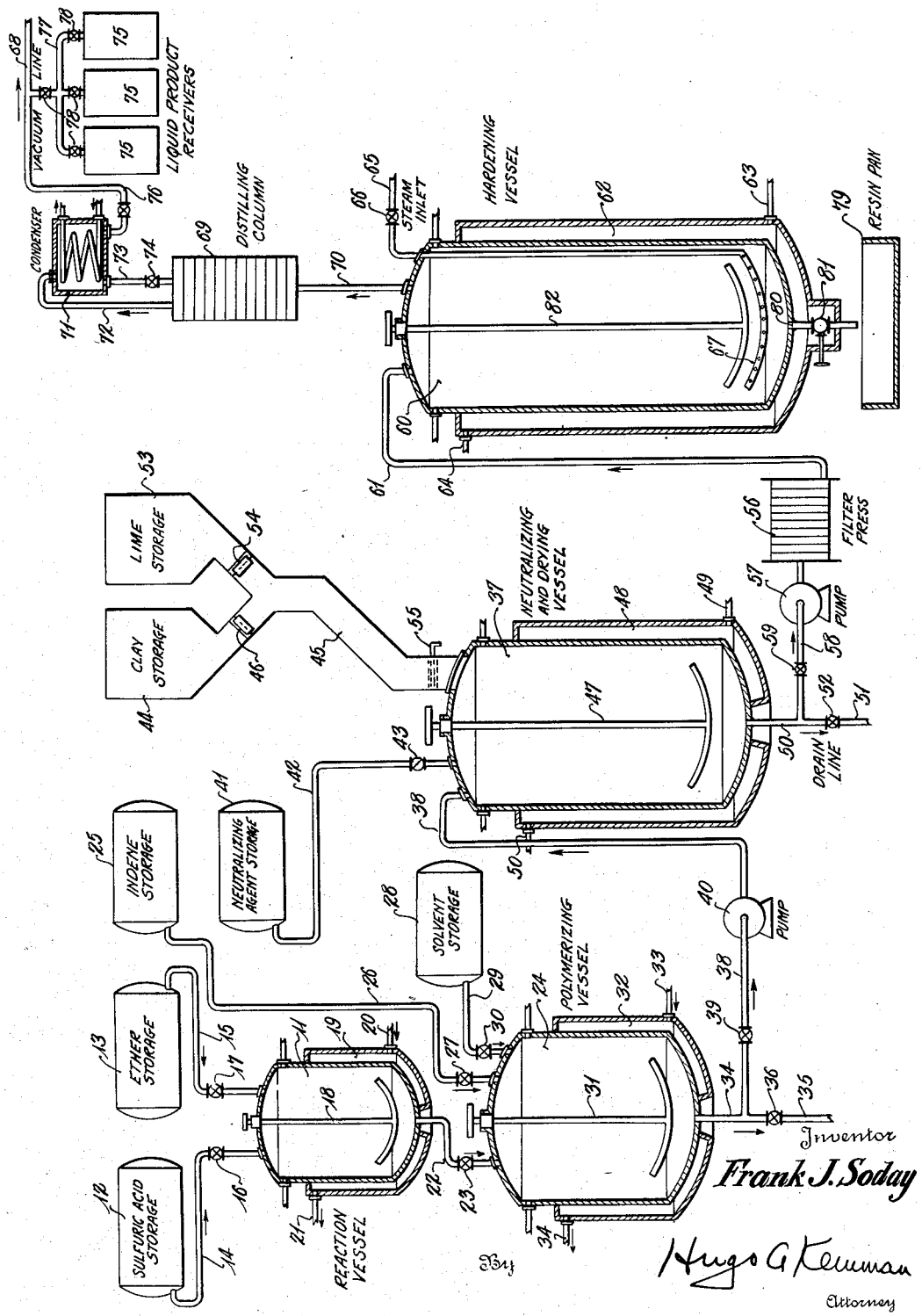
Inventor
Frank J. Soday
By Hugo G. Kenman
Attorney Patented Apr. 17, 1945

2,373,714

UNITED STATES PATENT OFFICE 2,373,714

POLYMERIZATION OF INDENE

Frank J. Soday, Upper Darby, Pa., assignor to The United Gas Improvement Company, a corporation of Pennsylvania Application August 16, 1939, Serial No. 290,503

9 Claims. (Cl. 260—80)

This invention relates to the preparation of indene polymers by the polymerization, by means of a catalyst selected from the class consisting of alkyl and aryl acid sulfates, of indene which is substantially free from coumarone, including pure indene, and including hydrocarbon fractions containing indene but substantially free from coumarone.

Indene is an unsaturated hydrocarbon, the structure of which may be represented as follows:

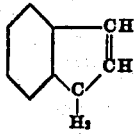

In its purified form, indene is a colorless, oily liquid boiling at 182° C., solidifying at −2° C. and having a specific gravity of 0.9910 at 15° C.

Indene occurs generally in coal tar and in hydrocarbon fractions obtained in the distillation of coal tar, particularly the higher boiling unsaturated fractions commonly referred to as crude solvent naphtha.

In such fractions, indene is often associated with coumarone, an oxygen containing unsaturated compound having a structural formula somewhat similar to indene, as follows:

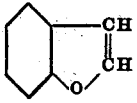

Hydrocarbon fractions containing indene may be utilized for the production of resinous polymers by effecting polymerization of the unsaturated constituents of such fractions.

In the manufacture of artificial gases such as coal gas, oil gas and carburetted water gas, considerable quantities of tar are produced and the gas contains substantial quantities of readily condensable materials. Indene may generally be found in the condensate and in the light oil obtained upon distillation of these various tars.

Fractionation of light oil from coal gas, oil gas or carburetted water gas yields fractions, the higher boiling of which contain large concentrations of indene. Pure indene may be obtained from these fractions by further treatment using special processes.

Generally speaking, fractions obtained from oil gas or carburetted water gas manufacture do not contain coumarone, as does a fraction obtained from coal gas manufacture. As is of course well known in the gas making art, the manufacture of oil gas or carburetted water gas involves the pyrolytic decomposition of petroleum oil.

Indene or hydrocarbon fractions containing indene, may be polymerized to yield resinous materials by contacting with sulfuric acid. However, the polymerization of indene with sulfuric acid is a highly exothermic reaction and is thus very difficult to control. There is a pronounced tendency for the reaction temperature to increase at a very rapid rate at certain stages of the polymerization resulting in the production of a relatively large proportion of sludge, as well as the production of a dark colored resin of inferior solubility in the usual solvents.

Furthermore, unduly large losses of reactive material in the form of sludge results from undesirable side reactions when sulfuric acid is used as a catalyst for indene polymerization. This is due to an intense local superheating in various portions of the reacting material during the course of the reaction. The recovery and purification of the resinous polymers from the polymerized material obtained under these conditions is an extremely difficult undertaking. In addition, the resin obtained is frequently of such character as to be of little value for many industrial applications such as, for example, the preparation of coating compositions.

I have found that the polymerization of substantially coumarone-free indene including pure indene and hydrocarbon fractions containing indene but substantially free from coumarone may be effected, and the exothermic nature of the reaction carefully controlled with the production of indene resins of unvarying quality and unusually good properties, by the use of alkyl, and aryl acid sulfates as polymerizing catalysts.

Generally speaking, the alkyl and aryl acid sulfates which I have found effective for the polymerization of hydrocarbon fractions containing indene and substantially free from coumarone and for the polymerization of substantially coumarone-free indene generally may be prepared by the reaction of sulfuric acid or sulfonating agents upon ethers, alcohol, esters, and olefines.

Although alkyl and aryl acid sulfates suitable for use as indene polymerization catalysts may be prepared by any of these methods, the use of organic ethers has been found to be a particularly convenient and advantageous method for their production.

The reaction products of ethers and sulfuric acid are highly desirable as polymerization catalysts, not only because of their property of producing light colored indene resins of good quality when employed in accordance with my invention, but also because of their stability. Such catalysts may be stored for relatively long periods of time without any serious loss of catalytic activity.

When the indene polymerization catalysts are prepared from organic ethers, various alkyl, aryl-alkyl, and aryl ethers may be used. The choice of the ethers will depend upon a number of factors such as, for example, ready availability, low cost, convenience in handling, and the like.

Illustrative of alkyl ethers which produce desirable catalysts may be mentioned, among others, diethyl ether and diisopropyl ether, having the following general structural formulae:

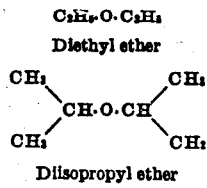

Diethyl ether

Diisopropyl ether

Among the aryl-alkyl ethers which are suitable for the production of indene polymerization catalysts may be mentioned, as examples, anisole and phenetole, having the following general structural formulae:

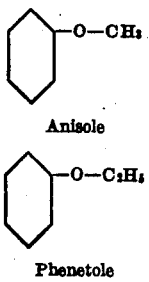

Anisole

Phenetole

Ilustrative of the aryl ethers which may be reacted with sulfuric acid to produce desirable indene polymerization catalysts may be mentioned, among others, diphenyl oxide having the following general structural formulae:

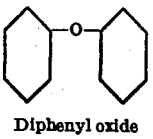

Diphenyl oxide

In addition to ethers, other organic compounds may be reacted with sulfuric acid to produce suitable catalysts for the polymerization of indene.

For example, the reaction of sulfuric acid in alcohols produces alkyl or aryl hydrogen sulfates which are also effective as indene polymerization catalysts. Illustrative of the suitable alcohols may be mentioned, among others, ethyl alcohol and isopropyl alcohol.

The reaction products of sulfuric acid and organic esters such, for example, as ethyl acetate, methyl acetate, and isopropyl acetate, are highly satisfactory as indene polymerization catalysts.

Generally speaking, the essential constituent of the catalysts which may be used for the polymerization of substantially coumarone-free indene and of indene-containing hydrocarbon fractions substantially free from coumarone is an alkyl or aryl acid sulfate. This is generally the case regardless of the materials from which such catalysts are prepared, the method of their preparation or the nature and relative proportions of any other components with which such catalysts may be associated.

The nature of the indene-containing fraction to be polymerized will determine to a large extent the manner in which the catalysts will be prepared in order to secure a polymerization product of the desired quality.

Various methods for the preparation of organic acid sulfates suitable for the catalysis of indene polymerization reactions will be discussed more in detail hereinafter.

The polymerization is preferably carried out by the addition of the catalysts to the indene or mixture containing indene although other methods may be used if desired.

The exact mechanism of the polymerization of indene is unknown. It is believed, however, that the reaction proceeds stepwise by the regular addition of successive molecules of the monomer to the double bond present at the stage of polymerization immediately preceding. The resulting polymer presumably has the following configuration.

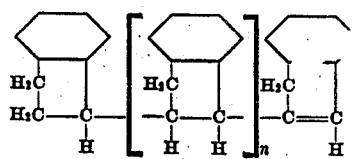

$n$ representing any number of monomer molecules entering into the polymer structure.

The polymer also may contain a number of side chains, depending, among other things, upon the polymerizing conditions employed.

The formula of the indene resin molecule given is by way of illustration only, and is not to be construed as limiting the process in any way.

Although the process of the present invention is particularly adapted to the preparation of indene polymers from hydrocarbon fractions containing indene and substantially free from coumarone, pure indene and other fractions containing high concentrations of indene and substantially free from coumarone may be utilized with the production of desirable resinous products.

In order to insure the production of light-colored high melting resins, the temperature of the polymerization reaction should be controlled within fairly narrow limits.

In general, polymerizing temperatures in the range of 0 to 50° C. are preferred, and particularly temperatures within the range of 10 to 30° C.

The use of aryl and alkyl acid sulfates as indene polymerization catalysts, generally speaking, makes unnecessary any external means of cooling the reaction mixture.

However, the reaction mixture may, if desired, be cooled during the course of the reaction to prevent the development of excessive temperatures.

Among other ways, such cooling may be effected by circulating a cooling medium through cooling coils immersed in the reaction vessel, circulating a cooling medium around the outer surfaces of the reaction vessel, or the reaction mixture may be circulated through external condensers during the course of the reaction.

It is generally desirable to thoroughly agitate the reaction mixture during the polymerization process in order to maintain an even temperature throughout.

Generally speaking, when the material to be polymerized contains a high concentration of indene, an inert solvent is preferably added thereto as a diluent before the addition of the catalyst.

Solvents suitable for this purpose include hydrocarbon solvents, chlorinated solvents, and other solvents which are not attacked by the catalyst during the course of the polymerization.

Illustrative of the hydrocarbon solvents may be mentioned, among others, benzene, toluene, xylene, petroleum ether, petroleum naphtha, solvent naphtha, and heptane.

Illustrative of chlorinated solvents which may be used as diluents may be mentioned, among others, chloroform, carbon tetrachloride, ethylene dichloride, and chlorobenzene.

The use of such inert solvents is also advantageous after a hydrocarbon fraction containing a high concentration of indene, for example, pure indene, has been polymerized. The reaction product of such a polymerization, generally speaking, is solid or highly viscous and in such case may be relatively difficult to purify. When it is desired to polymerize substantially pure indene or hydrocarbon fractions containing high concentrations of indene, but substantially free from coumarone, suitable solvents such as, for example, any of the solvents hereinabove enumerated, may be utilized to dissolve the solid or highly viscous reaction mass, after which the purification may proceed in the usual way.

In the practice of the process, the polymerization reaction may be carried out batchwise in suitable containers, or various continuous or semi-continuous methods may be utilized.

The quantity of alkyl or aryl acid sulfate catalysts which may be used to effect polymerization of hydrocarbon fractions containing indene but substantially free from coumarone, is not critical. Generally speaking, approximately 1 to 10% by volume of catalyst based upon the indene present in the mixture undergoing polymerization will be found sufficient in most cases, although larger quantities of catalyst may be employed if desired, particularly for the polymerization of fairly dilute solutions.

After the completion of the reaction, the polymerized mixture is generally allowed to settle for a short period of time, after which the catalyst layer may be drained off or removed by other suitable methods.

The remaining traces of catalyst may then be removed by neutralization with alkaline solutions, such as, for example, aqueous sodium carbonate, sodium hydroxide, or lime solutions, or with various contact materials, such as, for example, clay, fuller's earth, diatomaceous earth, alumina, silica, or similar materials.

Various combinations of these methods may also be employed to remove the remaining traces of catalyst with equally good results.

For example, the polymerized solution may be neutralized with an aqueous sodium carbonate solution, followed by the removal of the water layer, and the application of clay. After the removal of the clay, the solution will be found to be light in color and completely neutralized.

In general, neutralization with contact agents such as clay may be normally carried out at elevated temperatures, such as for example, 100 to 110° C.

The ease with which the polymerized solutions resulting from this process may be neutralized is a valuable characteristic of the present invention.

Under prior art methods, when sulfuric acid was used for the polymerization of indene and coumarone in hydrocarbon fractions the polymerized solution, generally speaking, could not be completely neutralized by the application of clay alone due to the presence of excessive quantities of acid sludge and sulfonated materials.

However, when alkyl or aryl acid sulfates are employed as catalysts for the polymerization of indene substantially free from coumarone, under normal polymerizing conditions, the catalyst may be completely removed at the end of the polymerizing process by treatment with clay.

The use of alkyl or aryl acid sulfates as catalysts, when polymerizing substantially coumarone-free indene according to my invention, avoids the necessity of using alkaline solutions to effect neutralization.

Alkaline solutions may, of course, be used, if desired, either alone or in conjunction with the use of other neutralization agents such as clay.

The polymerized solution is preferably distilled in order to remove unpolymerized material, as well as to afford a separation between the liquid polymers, commonly referred to as heavy oil, and the solid resinous polymers. In general, however, only very small quantities of the liquid polymers are normally obtained in the practice of my invention.

The distilling and hardening operations may be carried out in any suitable manner, such as, for example, distillation under reduced pressure.

Steam distillation, using either saturated or superheated steam, may also be employed in the distilling and hardening operations with excellent results, especially when carried out under reduced pressure.

The indene resins obtained as a result of the process outlined herein are, generally speaking, light in color, compatible with varnish oils and the usual solvents, and have fairly high melting points. They may be used for the preparation of oil varnishes, spirit varnishes, paints, lacquers, enamels, and coating compositions in general. They have excellent water and alkali resistance and can be used to advantage for applications requiring a coating with good dielectric properties.

One exemplary method for carrying out the process may be to proceed in a semi-continuous manner, starting initially with the formation of the organic acid sulfate catalysts, and proceeding through the polymerization of the indene to the separation of the liquid and solid polymer products.

Such a procedure is diagrammatically illustrated in the accompanying figure, where there is shown apparatus for the production of an organic acid sulfate catalyst, and connected therewith, apparatus for the polymerization of hydrocarbon fractions containing indene and substantially free from coumarone, apparatus for the neutralization and purification of the polymerized reaction product, and apparatus for the separation of the various polymer products thus produced.

Coming now to the initial step in such a procedure, namely that of preparing the catalyst, it has been pointed out above that one convenient method, among others, for the preparation of alkyl or aryl acid sulfate catalysts is to react sulfuric acid with an organic ether selected from the class consisting of alkyl, aryl-alkyl, and aryl ethers.

While this reaction may be carried out in any desired manner, a preferred method comprises mixing the desired ether with the sulfuric acid at room temperature, followed by heating to a temperature sufficiently high to promote the reaction between the sulfuric acid and the ether. The temperature, however, should not be increased to such a point as to cause any appreciable decomposition of the ether or the substituted sulfuric acid catalyst subsequently obtained.

The proportions of acid and ether used in the preparation of the catalyst may be varied over very wide limits, the properties of the resulting catalyst depending in part on the proportions utilized.

A particularly stable catalyst for the polymerization of indene substantially free from coumarone and one possessing good polymerizing properties, may be prepared by reacting sulfuric acid with the desired ether in proportions of approximately two mols of acid to approximately one mol, or slightly less, of ether.

An indene polymerization catalyst prepared in this manner may be stored for relatively long periods of time without any serious loss of its catalytic activity.

While the exact nature of the reaction by which the indene polymerization catalysts herein described are formed, by the action of the sulfuric acid upon organic ethers, has not been definitely determined, the following is offered as a possible explanation.

An ether, such, for example, as diethyl ether is believed to first react with the sulfuric acid to form ethyl hydrogen sulfate and ethyl alcohol.

$$CH_3 \cdot CH_2 \cdot O \cdot CH_2 \cdot CH_3 + H_2SO_4 \rightarrow CH_3 \cdot CH_2 \cdot HSO_4 + CH_3 \cdot CH_2OH$$

Sulfuric acid is then believed to react with the ethyl alcohol to form additional quantities of ethyl hydrogen sulfate, together with an equimolecular quantity of water.

$$CH_3 \cdot CH_2OH + H_2SO_4 \rightarrow CH_3 \cdot CH_2HSO_4 + H_2O$$

These reactions indicate the products which are believed obtained when mixtures containing proportions of approximately two mols of acid per mol of ether are used in preparing the polymerization catalyst. The use of other desired proportions of acids and ethers results in the preparation of catalysts which may possess somewhat different properties.

In general, it may be said that the activity of the catalyst will depend upon the quantity of acid used in the preparation of the catalyst relative to the quantity of organic ether employed.

It is important to control the activity of the polymerization catalyst prepared in order to control the exothermic polymerization reaction. It will be appreciated that catalysts containing free sulfuric acid will, in general, bring about a polymerization reaction with a rapid evolution of heat.

For example, the use of larger quantities of acid than those shown above results in the production of a catalyst which consists essentially of a mixture of sulfuric acid and alkyl and/or aryl acid sulfates. This catalyst, because of its sulfuric acid content, will be more active than the catalyst previously described when used for the polymerization of indene or hydrocarbon fractions containing indene, but substantially free from coumarone.

The use of smaller quantities of acid results in the production of a catalyst containing either free alcohol or ether or both, depending upon the ratio of the reactants employed and the conditions under which the catalyst was prepared, such as, for example, the temperature and the length of the reaction.

In general, a catalyst produced in this manner is somewhat less active than a catalyst produced by the reaction of two mols of acid with one mol of ether.

Similar reactions occur in the case of other alkyl or aryl ethers which may be used for the production of indene polymerization catalysts.

For example, when an indene polymerization catalyst is prepared through the reaction of sulfuric acid with an alkyl-aryl ether, the resulting catalyst comprises a mixture of alkyl acid sulfate and aryl acid sulfate, if the reaction is carried to completion. This is shown in the following reaction, in which phenetole is reacted with sulfuric acid.

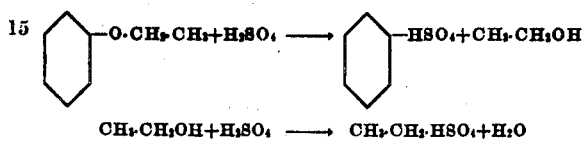

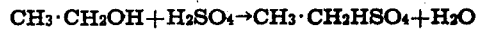

Substituted ethers may, if desired, be used in place of ordinary ethers with equally good results. For example, dichlorodiethyl ether may be reacted with sulfuric acid to give a suitable catalyst.

Although reference has been made more specifically to the use of organic ethers for the production of indene polymerization catalysts, it is to be understood that these materials have been referred to as illustrative examples only, and that organic acid sulfates prepared in other ways, such, for example, as the reaction of sulfuric acid with olefines, alcohols and esters, may additionally be used as effective polymerization catalysts for substantially coumarone-free hydrocarbon fractions containing indene and for substantially coumarone-free indene generally.

In the diagrammatic flow sheet of the accompanying drawing, 11 represents a reaction vessel in which the polymerization catalyst may be prepared. Sulfuric acid from the storage tank 12 and an organic ether from storage tank 13 may be added to the reaction vessel 11 through lines 14 and 15 respectively controlled by valves 16 and 17 respectively. The reactants may be thoroughly agitated by means of stirrer 18, if desired.

The reaction vessel 11 is provided with a heating and cooling chamber 19 within which there may be circulated heating or cooling media introduced through lines 20 and withdrawn through lines 21.

Generally speaking, the reactants for the preparation of the indene polymerization catalysts are preferably initially contacted at room temperature, after which they are preferably heated to a temperature between 50 and 100° C. to effect the reaction. For this purpose, it may be necessary or desirable to initially flow cooling liquid through the chamber 19 while mixing the reactants, and thereafter flow a heating liquid through chamber 19 in order to effect reaction of the sulfuric acid and the organic ether.

Line 22 connects the reaction vessel in which the catalyst may be prepared, with the polymerizing vessel. The indene substantially free from coumarone or the hydrocarbon fractions containing indene but substantially free from coumarone to be polymerized are preferably added to the polymerizing vessel prior to the addition of the catalyst, though this is not essential.

Line 22 is provided with valve 23 in order that the rate of addition of the catalyst to the indene fractions contained in the polymerizing vessel 24 may be controlled. The charge stock for the polymerizing vessel 24 may be supplied thereto from storage tank 25 through the feed line 26 controlled by valve 27.

As has been mentioned, when pure indene or a substantially coumarone-free hydrocarbon fraction containing a high concentration of indene is employed, it is generally advisable to add thereto a solvent as a diluent. The solvents may be added to the polymerizing vessel from the solvent storage tank 28 through feed line 29 controlled by valve 30.

The polymerizing vessel 24 may be equipped with a stirrer or other agitating means, 31, and a heating and cooling chamber 32. The heating or cooling chamber 32 may be equipped with feed line 33 and withdrawal line 34 for the circulation therethrough of heating and cooling liquids.

In carrying out the polymerization reaction, the desired quantity of indene, or a hydrocarbon fraction containing indene, and substantially free from coumarone may be withdrawn from its storage tank 25 and introduced into the polymerizing vessel 24 followed by the addition of solvents, if desired, from the solvent storage tank 28. The alkyl or aryl acid sulfates, or mixtures containing one or both of these, may then be slowly added to the material in the polymerizing vessel 24. The temperature should be maintained at a suitable temperature, such as 20 to 30° C., during the course of addition.

The reaction is preferably continued for an additional period of time to insure the desired degree of polymerization, the temperature being maintained within a suitable range, such as 20 to 30° C. during the reaction period. The mixture is preferably continuously agitated during the course of the reaction, for example, by means of the stirrer 31. After the completion of the reaction, the mixture may be allowed to settle after which the spent catalyst and sludge may be removed, for example, by means of lines 34 and 35 controlled by valve 36.

The polymerized solution may then be transferred to the neutralizing and drying vessel 37 through lines 34 and 38, controlled by valve 39. A pump 40 may be introduced in line 38, if desired, to transfer the polymerized products to the neutralizing and drying vessel 37.

In the neutralizing vessel 37 the polymerized mixture may be neutralized by means of an aqueous alkaline solution, or clay, or by combination of these methods. If a neutralizing agent is employed, it may be added to the neutralizing and drying vessel 37 from the storage tank 41 through line 42 controlled by the valve 43. If clay is utilized to effect the neutralization of the polymerized solution, the clay may be added to the neutralizing or drying vessel 37 from storage tanks 44 through line 45 controlled by sliding valves 46 and 55, or in any other suitable manner, as desired.

The neutralizing and drying vessel 37 may be equipped with a stirrer or other agitating means 47, and with a heating and cooling chamber 48, if desired, through which may be circulated heating and cooling liquids introduced through line 49 and withdrawn through line 50.

After the neutralization of the polymerized solution has been completed, any aqueous solution which may have been added may be removed through the lines 50 and 51 controlled by valve 52. The neutralized solution containing the indene polymers may then be dried, if desired, by the application of lime, stored in storage tank 53 and added to the neutralizing and drying vessel in any suitable manner such as, for example, through line 45 controlled by sliding valves 54 and 55.

The further drying of the polymerized mixture may be omitted if desired.

The polymerized mixture may then be filtered by any suitable means, such, for example, as by forcing it through a suitable filter press 56 by means of a pump 57 inserted in lines 58 and 58, the latter preferably containing a valve 59 for controlling the rate of flow of the polymerized mixture to the filter press.

After filtering, the polymerized solution may be delivered to hardening vessel 60 by means of line 61. In the hardening vessel the solvent and oily polymers may be removed from the solid polymers by any desired method.

In the diagrammatic flow sheet the separation of the oily polymers and the solvents from the solid polymers is diagrammatically shown as being effected by distillation although other suitable methods may be employed.

The hardening vessel 60 may be equipped with a stirrer or agitating means 62, and with a heating or cooling chamber 62 through which may be circulated heating or cooling liquids introduced through lines 63 and withdrawn through line 64. Steam may be introduced into the hardening vessel 60 by means of the line 65 controlled by valve 66, this line preferably extending nearly to the bottom of the hardening vessel and terminating in the distribution ring 67.

After introduction of the polymerized solution into the hardening vessel 60, it may be first distilled by the application of heat suitably under reduced pressure maintained by means of vacuum line 68 connected to a vacuum pump not shown. The vapors may be passed from the hardening vessel 60 into the distilling column 69 through line 70 and thereafter through condenser 71 connected to the distilling column by lines 72 and 73. The return line 73 may be equipped with a control valve 74.

The condensed vapor products may be collected in the liquid product receivers 75, connected to the condenser by means of line 76 and distributing means 77 controlled by valves 78.

After the above described removal of liquid products from the polymerized mixture contained in chamber 60, steam may be introduced into the hardening vessel through line 65 and distributing means 67 to remove heavy oils. The residual polymerized mixture remaining after the hardening operation may then be transferred to the resin pan 79 through line 80 controlled by valve 81, and allowed to harden into the desired resinous polymer in pan 79. Valve 81 should preferably be positioned within the heating or cooling chamber 62.

Although there has been described the production of indene polymers by a somewhat specific process, it is to be understood that this has been illustrative only of the general nature of this invention and is not in any sense a limitation thereof.

For example, the alkyl and aryl acid sulfates may be prepared in any other desired manner, and at any desired temperature and in any desired proportion.

Substantially coumarone-free hydrocarbon fractions containing any desired concentration of indene may be employed, and the use of a solvent as a diluent may or may not be utilized as desired.

Any desired neutralization agent or other materials for removing excess acid from the catalyst may be employed in any manner as desired, and other methods of effecting removal of water from the polymerized product may be used.

Filtration of the polymerized product may be accomplished in any manner found desirable, and the resultant polymers may be purified and separated by any convenient method.

The following examples will further serve to exemplify the herein described process for the polymerization of substantially coumarone-free indene and for the preparation of indene polymerization catalysts suitable for use in the herein described polymerization processes.

Example I

Approximately 20 parts by volume of sulfuric acid was slowly added to approximately 80 parts by volume of diisopropyl ether with thorough agitation. The temperature of the reaction mixture was maintained below 50° C. by circulating a cooling medium around the outer surfaces of the reaction vessel.

A quantity of pure indene equivalent to approximately 10 times the volume of catalyst mixture, prepared from sulfuric acid and diisopropyl ether, was thoroughly mixed with an equivalent volume of xylene as a diluent, and the mixture cooled to a temperature of approximately 25 to 30° C. To this mixture there was then added the catalyst mixture slowly and with vigorous stirring. The temperature of the reaction mixture was maintained at approximately 30° C. throughout the entire reaction by circulating a cooling mixture around the outer surfaces of the polymerizing vessel.

After a period of approximately five hours, the polymerized solution was transferred to a neutralizing and drying vessel where the catalyst was neutralized by the addition of a 20% solution of sodium hydroxide. Additional solvent was then added to the neutralized solution after which it was well washed with water and dried over lime.

The solvent and unpolymerized material was removed by distillation at a temperature of 200° C. and under a reduced pressure of approximately 20 mm. of mercury, absolute.

The residual mixture was transferred to a resin pan and allowed to harden.

There was obtained a light-colored indene resin, soluble in the usual solvents and compatible with varnish oils.

Example II

Approximately 700 parts by volume of an indene fraction obtained by the distillation of light oils from oil gas, and having the following properties:

Boiling range_____ 180–183° C. at 760 mm.
Density (D 20/4)_____ 0.9713
Refractive index (n 20/D)_____ 1.5600
Refractive intercept _____ 1.0743
Indene content _____ 83.7% by weight,
  as determined by bromine titration was mixed with approximately 500 parts by volume of high-flash petroleum naphtha in a polymerizing vessel equipped with a stirrer. To this mixture, there was slowly added with thorough agitation a catalyst prepared by reacting 50 parts by volume of sulfuric acid with approximately 45 parts by volume of diethyl ether. The polymerization was then allowed to proceed at a temperature between 20 and 25° C. maintained within this range by circulating a cooling medium around the outer surfaces of the polymerizing vessel. Temperature control and continual agitation was utilized to prevent any sudden temperature surges within the polymerizing mixture.

The polymerization was allowed to proceed for a period of approximately five hours after which the catalyst was removed therefrom and the remaining polymerized solution transferred to a neutralizing and drying vessel.

In the neutralizing and drying vessel approximately 100 parts of fuller's earth was added to the polymerized mixture. It was then heated to a temperature of approximately 100 to 110° C., for fifteen minutes and subsequently filtered. The polymerized solution thus obtained was clear and very light in color.

The polymerized solution was next transferred to a hardening vessel where the volatile constituents were removed by steam distillation.

The resultant indene resin was found to be soluble in the usual solvents and compatible with varnish oils and additionally possessed highly desirable properties for industrial application.

Example III

Approximately 700 parts by volume of a hydrocarbon fraction containing indene, and having the same properties as those stated in Example II was mixed with approximately 500 parts by volume of petroleum spirits in a polymerizing vessel provided with an agitator and an external temperature control jacket. To this mixture was slowly added with constant stirring an organic acid sulfate catalyst prepared by reacting 30 parts by volume of sulfuric acid with 40 parts by volume of diisopropyl ether. The polymerization reaction was maintained at a temperature of 30° C. or less by circulating a cooling medium around the outer surfaces of the polymerizing vessel.

The polymerization was allowed to proceed for a period of approximately three hours, after which the spent catalyst was removed. Fuller's earth was then added to the polymerized mixture. It was then heated to 100 to 110° C. for a period of approximately 30 minutes and subsequently filtered.

There was obtained a clear, light-colored solution of indene resin.

From the polymerized solution, the indene resin was obtained by removing the solvent by steam distillation. The resinous polymer thus obtained amounted to a yield of 80% of the theoretical yield calculated from the proportions of reactants employed.

This resinous polymer was very light colored and was found to be readily compatible with the usual drying oils.

Illustrative of methods for preparing organic acid sulfates, suitable as catalysts for the polymerization of substantially coumarone-free indene, are given in the following examples:

Example IV

Fifty parts by volume of 96% sulfuric acid was slowly added with constant agitation to approximately 45 parts by volume of diethyl ether in a reaction vessel provided with an agitator and a temperature control jacket.

The temperature of the mixture of sulfuric acid and diethyl ether was maintained below 30° C. until the entire mixture had been thoroughly agitated and mixed.

Reaction between the sulfuric acid and the diethyl ether was effected by heating the mixture of these reactants to a temperature of approximately 70° C. for a period of approximately one hour. This heating was effected by introducing a heating medium in the temperature control jacket surrounding the reaction vessel.

The resultant catalysts, comprising ethyl hydrogen sulfate and water, was found to be an extremely effective and desirable catalytic agent for the polymerization of substantially coumarone-free hydrocarbon fractions containing indene. When so used, it produced clear resinous indene polymers free from color and suitable for many industrial applications. This catalyst was additionally found to be an extremely stable catalyst, maintaining its activity almost indefinitely.

Example V

Thirty parts by weight of 66° Baumé sulfuric acid was slowly added with constant stirring to approximately 40 parts of diisopropyl ether. During the mixing of these materials the temperature was maintained at or below 30° C. After the reactants had been thoroughly mixed, the mixture was heated to a temperature of approximately 60° C. for a period of approximately three hours.

The resultant organic acid sulfate was found to be an excellent catalyst for the polymerization of substantially coumarone-free hydrocarbon fractions containing indene, and possessed high polymerizing activity even after storage for a relatively long period of time.

Indene polymers prepared by the process herein described possess properties which make them particularly adapted to many industrial applications. Because the polymerization of indene substantially free from coumarone may, by the process herein described, be effected under relatively low temperature conditions, the resultant polymer is, generally speaking, found to be clear and free from color. Additionally, polymerized solutions free of acid sludge are obtained, thus resulting in greater yield of the desired indene polymer.

Illustrative of the many applications of indene polymers prepared by the process herein described, may be mentioned the use of such polymers in coating composition formulations, particularly in the preparation of varnishes. Reference is made to my copending application Serial No. 481,296, filed March 31, 1943.

Illustrative of the use of an indene polymer prepared by the herein described process, is given the following illustrative examples.

Example VI

A mixture of twelve parts of indene resin, prepared as described above, and 14 parts of tung oil was heated to a temperature of approximately 400° F. during a period of approximately 20 minutes. This mixture was then heated to a temperature of approximately 560° F. during a period of ten minutes and held at this temperature for an additional period of three minutes. It was then allowed to cool to 535° F., held at this temperature for a period of six minutes, and then chilled to a temperature of 400° F. At this temperature 26 parts of naphtha was added to reduce the varnish mixture, and thereafter the mixture was allowed to cool to room temperature. To the varnish mixture thus prepared, a desired quantity of drier was added at room temperature.

The varnish thus obtained was a highly desirable protective coating composition, and was almost entirely free of the usual varnish discoloration.

It will be understood that the term "hydrocarbon fraction containing indene" or its equivalent, as used in the specification and claims, is intended to embrace a fraction containing indene as well as a substantial amount of other hydrocarbons. An indene fraction having the characteristics of the fraction mentioned above in Example II is one instance of a material falling within the scope of the terminology herein.

While representative procedures for the preparation of indene polymers from substantially coumarone-free indene including substantially coumarone-free hydrocarbon fractions containing indene, and for the preparation of organic acid sulfate catalysts utilized in said polymerization processes have been particularly described, it is to be understood that these are by way of illustration only. Therefore, changes, additions, substitutions, and/or modifications may be made within the scope of the claims without departing from the spirit of the invention.

I claim:

1. A method comprising polymerizing indene substantially free from coumarone by contacting said indene with a catalyst selected from the group consisting of alkyl and aryl acid sulfates under temperature conditions not exceeding approximately 50° C.

2. A method of producing resinous polymer from indene substantially free from coumarone which comprises polymerizing said indene in contact with an alkyl acid sulfate catalyst under temperature conditions between approximately 0° and 30° C. throughout substantially the whole reaction mass during substantially the whole reaction period.

3. A method of producing resinous polymer from indene substantially free from coumarone which comprises polymerizing said indene in contact with an aryl acid sulfate catalyst while maintaining temperature conditions between approximately 0° and 30° C. throughout substantially the whole reaction mass during substantially the whole reaction period.

4. A method for the polymerization of a light oil indene fraction substantially free from coumarone which comprises bringing a catalyst selected from the group consisting of alkyl and aryl acid sulfates into sufficient contact with said light oil indene fraction to effect said polymerization while maintaining temperature conditions not exceeding approximately 50° C. throughout substantially all of the reaction mass during substantially the entire extent of the reaction period.

5. Resin resulting from the process of claim 1.

6. Resin resulting from the process of claim 4.

7. A method comprising polymerizing indene substantially free from coumarone by contacting said indene with a catalyst selected from the group consisting of alkyl and aryl acid sulfates under temperature conditions not exceeding approximately 50° C., and in the presence of a solvent which is inert under the conditions obtaining.

8. The method of claim 1 in which the catalyst employed is ethyl hydrogen sulfate.

9. The method of claim 1 in which the catalyst employed is isopropyl hydrogen sulfate.

FRANK J. SODAY.